Feb. 29, 1944.                H. R. FISCHER                2,342,928
                          GUIDE FOR EJECTOR RODS
                          Filed Oct. 26, 1943            2 Sheets-Sheet 1
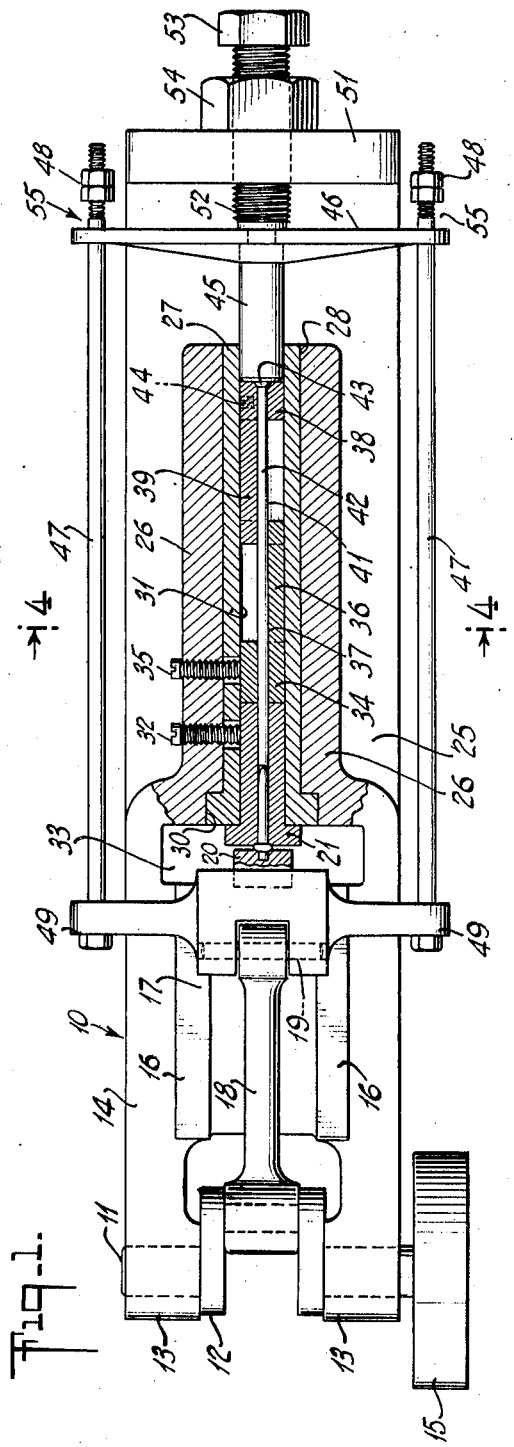
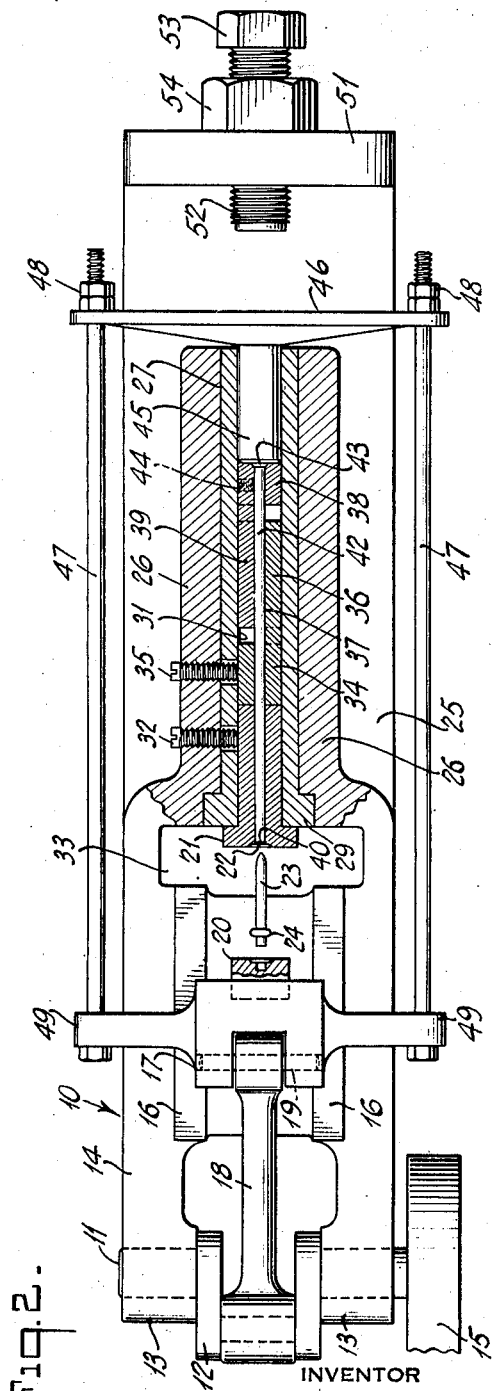
INVENTOR
HOWARD R. FISCHER.
BY
Raymond G. Mullee
ATTORNEY Feb. 29, 1944. H. R. FISCHER 2,342,928
GUIDE FOR EJECTOR RODS
Filed Oct. 26, 1943 2 Sheets-Sheet 2
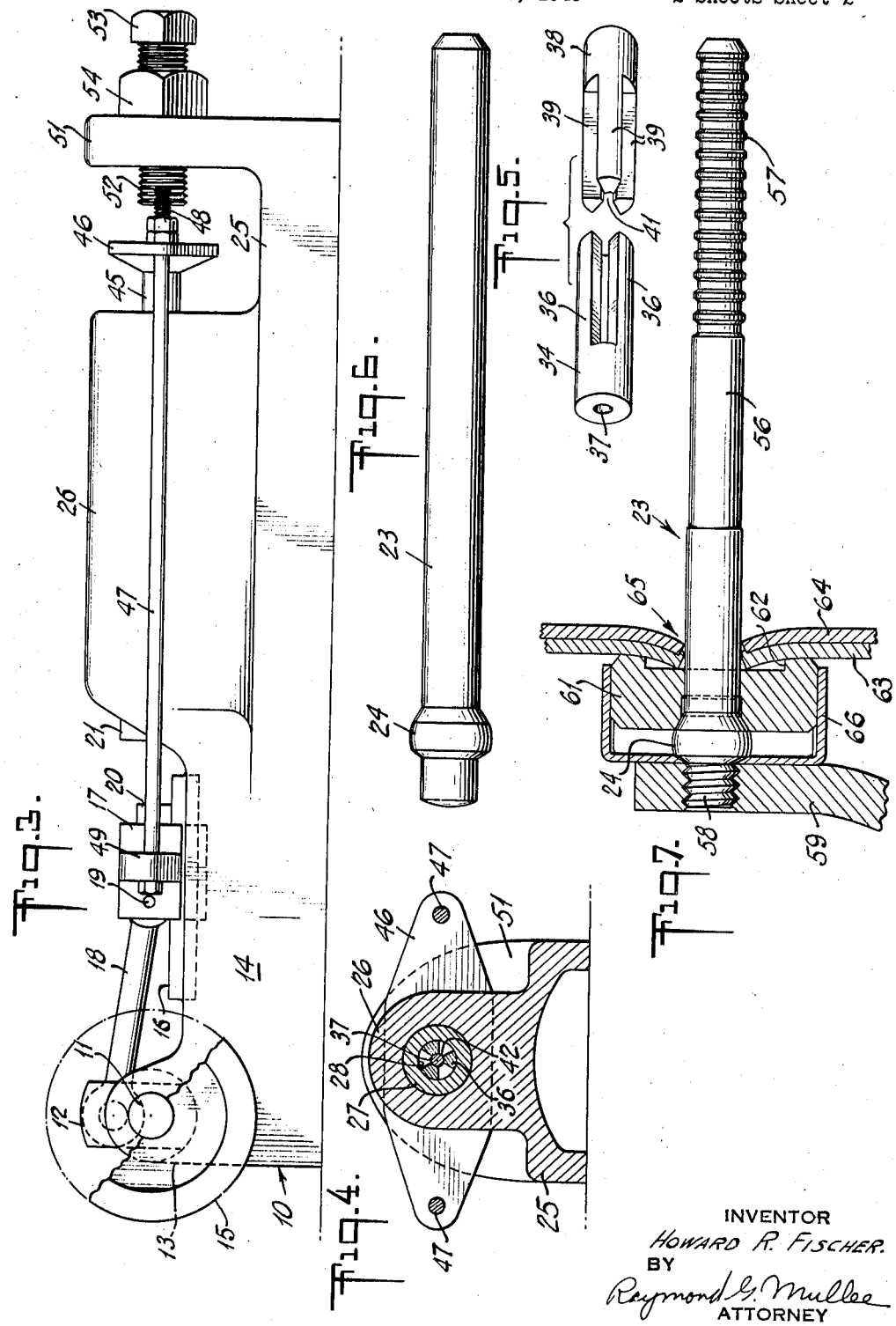
INVENTOR
HOWARD R. FISCHER.
BY
Raymond G. Mullee
ATTORNEY Patented Feb. 29, 1944

2,342,928

UNITED STATES PATENT OFFICE 2,342,928

GUIDE FOR EJECTOR RODS

Howard R. Fischer, Detroit, Mich., assignor to Chicago Pneumatic Tool Company, New York, N. Y., a corporation of New Jersey Application October 26, 1943, Serial No. 507,687

10 Claims. (Cl. 10—11)

This invention relates to machines for forming heads on small steel pins or work pieces by a cold upsetting operation, in the manufacture of dimpling mandrels, screws, blind rivets or similar devices. It is concerned particularly with a holder for a slender ejector rod which projects into the stationary die of such a machine to knock out the pin or mandrel after it has been headed.

The main object of the invention is to have a press or cold heading machine with a holder guide or support means providing effective support for the sides of a long ejector rod which will prevent bending or buckling of this rod during the head operation as well as during the ejection of a work piece after the same has been formed in said machine.

An ancillary object is to have support guide means of the character indicated providing adequate support for a long ejector rod along the entire length thereof in all positions of the same.

Another important object is to provide apparatus of this character with effective support guide means for a long ejector rod which will be capable of varying progressively in length to allow for longitudinal movement of the rod and maintain effective support for the latter at all points along its path of travel.

A further object is to produce holder guides or support means which are adapted for supporting and guiding a variety of types of ejector rods and for other purposes.

Other objects and the various advantages inherent in the invention and accruing from its actual application to practice will appear more fully in detail as this specification proceeds.

In order to facilitate ready comprehension of the invention and its use the same is illustrated in the accompanying drawings forming part hereof, and in which:

Fig. 1 is a plan view of a heading machine, press or like apparatus with certain portions in section to disclose a practical application of the invention to the art, including means for guiding and supporting a very long ejector rod used to eject a mandrel of limited cross section, the parts being shown as occupying positions characteristic of the end of a compression stroke preparatory to initiating the ejection of the mandrel;

Fig. 2 is a similar view of the same apparatus showing the parts in their extreme opposite position with the mandrel completely ejected and the apparatus in condition for a new cycle of operation;

Fig. 3 is a side elevation of the apparatus with the dies, crosshead and crank in an intermediate position;

Fig. 4 is a transverse section of the apparatus as taken on line 4—4 of Fig. 1;

Fig. 5 is an exploded perspective view but somewhat enlarged of two complementary members of the apparatus of Figs. 1-4 which form the guide holder or support means chiefly embodying the salient features of the present invention;

Fig. 6 is a greatly enlarged side elevation of the mandrel made by the apparatus of Figs. 1 to 5, before finishing and threading the same; and Fig. 7 is a similarly enlarged view which illustrates the mandrel in finished form as actually used with certain associated parts for dimpling sheet metal.

In heading machines, presses and like apparatus using dies for forming, swaging, shaping or otherwise altering the shape of work pieces or merely portions thereof, and especially for heading or modifying long work pieces such as mandrels, pins, rivets, special bolts and screws, etc., the nature of the work piece involved frequently gives rise to serious manufacturing problems which must be satisfactorily solved before manufacture of such work pieces can be placed on a production basis. One such problem arises from the extremely limited cross section of an ejector rod used for axial or longitudinal ejection of mandrels or bolts due to the limited transverse diameter of the latter, the ejector rod being therefore necessarily very long in comparison with its diameter. Consequently any considerable pressure exerted on the end of the rod will tend to cause failure thereof by bending, buckling or other distortion of the rod unless the sides thereof are well supported in some definite manner. Such support of the rod should of course be very firm without introducing new problems by obstructing or impeding any operative member used to move the ejector rod.

With the foregoing objects in view and in order to avoid the mentioned disadvantages, and particularly to solve the indicated problem, the invention includes special cooperating and separable rod guide and support members combined with certain special features of construction of the apparatus embodying and operating the same.

Hence referring again to the drawings, a press, a forming or heading machine, generally indicated at 10, has a continuously rotatable crankshaft 11 provided with a crank 12 and mounted for rotation in a pair of bearings 13 fixed upon a base or frame 14, while a flywheel 15 is secured at one end of said crankshaft and adapted to serve as a pulley for a belt drive, if desired. The machine frame carries a pair of parallel guides 16 for a cross-head 17 adapted to be reciprocated thereon by a connecting rod 18 connecting a wrist pin 19 on said cross-head with the crankshaft, with the result that rotation of the crankshaft will operate the cross-head. The latter is provided with a movable die 20 capable of cooperating with a complementary stationary die 21 having a bore 22 for receiving a steel pin or mandrel 23 in order to upset the same and produce a head or enlargement 24 on the latter. Stationary die 21 is constructed from a solid steel blank which is bored and reamed, then hardened, after which the hole 22 is lapped to an extremely smooth straight cylindrical surface.

Upon a rearward portion 25 forming the bed of the machine is a fixed die support 26 having a tightly fitted bushing 27 located in a longitudinal bore 28 and terminating at the forward end in a heavy flange 29 seated in a counterbore or recess 30 to prevent end pressure exerted rearwardly in or upon said bushing from displacing the same. This bushing has a uniform bore 31 extending longitudinally through the same and has the die 21 fitted in the forward end and retained in position by a set screw 32 serving to prevent accidental forward displacement. Rearward displacement of the die is blocked by the enlarged forward end or head of said die which projects into the gap 33 between guides 16 and fixed by support 26. Immediately behind the die 21 is a tubular guide member 34 retained in place by a second set screw 35, said member having a plurality of rearwardly directed segments 36 forming projections uniformly spaced apart by three milled grooves or radial slots extending inwardly to the central aperture 37 thereof. In the same bore 28 of the die support is a slidable second tubular member 38 also cut or slotted toward the central aperture 41 and provided with a corresponding plurality of forwardly projecting segments or projections 39 of such size and shape that they readily fit into the spaces between the segments 36 while being spaced apart sufficiently to allow said segments 36 to fit slidably between them. The projecting segments of both guide members thus interfit slidably so that the same may be slidably brought together into a compact nested relation of the same by sliding the second guide member 38 forwardly as far as the projections 39 will go into the slots between segments 36 on the stationary member 34.

In both tubular guide members the central bores 37 and 41 are of substantially the same diameter as that of the central bore 22 in die 21 and aligned therewith in order to accommodate an ejector rod 42 which terminates at the rear end in a countersunk head 43 in guide member 38 and extends through both guide members into bore 22 in die 21 so as to abut against the inner end of mandrel 23 as shown in Fig. 1. The rod is secured rigidly near the head thereof in guide member 38 by a small set screw 44 for a purpose which will presently appear.

Rearwardly upon the die support 26 is an ejector ram 45 projecting into bore 31 against the countersunk head 43 of the ejector rod, while the outer end of the ram is rigidly connected to a ram plate 46 which is preferably of reinforced construction and is simultaneously mounted on a pair of return rods 47 within adjustable lock nuts 48 upon the rear ends of the latter. The return rods are individually secured at their forward ends to a pair of oppositely extending arms 49 rigidly fixed upon cross-head 17. Thus the ram plate is supported upon the ram 45 and return rods 47 in a position to reciprocate generally with the movement of the cross-head as will now be explained. To the rear of the ram plate and at a predetermined distance from the die support 26 is a rigid upright lug 51 forming the rear termination of the machine bed or frame 25, in which is fixed a forwardly directed adjustable set screw 52 forming a rear stop for said plate and determining the extreme rear position of the ram and thereby of the second or rear tubular guide member 38 and the ejector rod 42, all as may be seen in Fig. 1. The mentioned stop may be adjusted by turning the head 53 thereon and thereby screw the set screw toward or from the die support, while a lock nut 54 serves to lock the set screw in attained position of adjustment.

In the operation of the machine, assuming the apparatus to be in initial condition for a cycle of operation as shown in Fig. 2, (which is also the final stage with respect to mandrel 23), a pin or mandrel to be operated upon is inserted by a suitable automatic feeding device (not shown) with its pointed end extending into the bore 22 in the stationary die against the end 40 of the ejector rod, while the other end is caused to register with the heading die 20. When the flywheel is then rotated from a power source by means of a belt to said wheel or by any other means known in the art, the crank 12 will be rotated from the position in Fig. 2 to that in Fig. 1, and the heading die will first push the mandrel 23 further into bore 22 of die 21 and by contact with the ejector rod will force the latter rearward, and with said rod the ram 45, until the ram plate 46 strikes stop 52. As the rear tubular guide member 38 is slidable in bore 31 and the ejector rod is for the present purpose fixed in the same by the set screw 44, said guide member will be carried rearwardly by the rod against the ram. In thus travelling rearward, the main body portion of the rear guide member 38 will become spaced a maximum distance from the main body portion of the first or stationary guide member 34. At the same time the mutually interfitting projections 39 and 36 respectively of the same guide members are drawn out so far that they interfit or overlap but a short distance, as apparent from Fig. 1. It should be mentioned in this connection that when the plate 46 is stopped by contact with rear stop 52, the return rods 47, propelled by rigid arms 49 on cross-head 17 will continue to move rearwardly by sliding through said plate 46 until a space or gap 55 appears between the plate and the rear nuts 48 on said rods.

Due to the fact that the bore in each guide member and in die 21 are aligned and of equal diameter and that the ejector rod fits smoothly in the mentioned bores, it is evident that the guide members and their interfitting projections support the sides of said rod throughout its entire length. When the crank 12 is caused to continue its rearward rotary movement, the mandrel, blocked by the rod 42, will be subjected to great end pressure by the heading die 20 on cross-head 17, the ejector rod withstanding the pressure by virtue of its support throughout derived from the guide members and their interfitting projections. The result is that the exposed portion of the mandrel between dies 20 and 21 will be expanded or mushroomed out to form head 24 as shown in Figs. 1, 6 and 7. At the same time the shank of the mandrel is also upset and becomes tightly wedged in the bore 22.

After the head has been formed on the mandrel, the crank 12 continuing its rotation will first begin to move the cross-head forward and the die 20 thereon away from die 21, and from the newly headed mandrel 23, and simultaneously the return rods 47 will travel forward, immediately taking up the gap 55 until the rear nuts 48 strike ram plate 46 and begin to exert a powerful pulling force on the plate and its ram 45 in the forward direction. At this point the pressure of the ram will begin to move rear guide member 38 and ejector rod 42 in the forward direction, correspondingly forcing the mandrel 23 forward and finally out of die 21. The pressure required to push the finished mandrel or rivet blank out of the die 21, in which it is wedged, is far in excess of the horizontal compression strength of any ejector rod capable of entering the bore 22 and of following the mandrel through the die. For this reason the invention provides a close fitting rigid support at every point along the rod, thereby overcoming any tendency of the rod to bend or buckle, due to the heavy load upon it. As seen in Figs. 4 and 5 the segments 36 and 39 of the holder are arranged to support the rod at three evenly spaced points around and throughout the length of the rod. The combined area in contact with the ejector rod is approximately equal to one-half the circumferential area of the hole 37. As the ram 45 moves forward and as the ejector rod 42 projects more deeply into die 21 the interfitting projections 36 and 39 of guide members 34 and 38 become increasingly nested or interfitting, the rod thus receiving continuous and progressively increasing support upon the sides thereof within bores 37 and 41 of said guide members and projections, as well as in the bore 22 of die 21. Even if very great pressure is developed by the ram on the rear head of the rod due to very formidable frictional resistance of the mandrel to displacement, the rod 42 will be prevented from collapsing or failing in any manner and hence will effect the displacement of the mandrel from die 21.

Illustrating an important use of the invention, and of the apparatus embodying the same as just described, the mandrel forming the projection of the same apparatus is fabricated further and employed as a pulling element or draw pin for dimpling sheet metal intended to form large portions of the exterior of aircraft. For example, the mandrel 23 as it leaves the apparatus is shown in greatly enlarged form in Fig. 6, wherein the head 24 is finished to proper shape and size. In Fig. 7, the mandrel is shown with the intermediate portion of the shank 56 slightly reduced in diameter while the pointed end has a series of spaced annular grooves 57 rolled or otherwise formed in the same, the head extension 58 being threaded to engage with a handle 59. A recessed die 61 is fitted beneath the head on the mandrel and has a recessed portion 62 forming a clearance allowing dimpling of a pair of metal sheets 63, 64 at 65 by means of a complementary dimpling die (not shown). A spring clip 66 fitted over the head detachably retains the recessed die in condition for ready removal by hand to replace the mandrel, pulling element or draw pin in case of breakage. Further details with respect to the dimpling operation when using such a mandrel and the apparatus employed with the same will be found more fully set forth in the copending application for Dimpling apparatus, Serial No. 461,355, filed October 13, 1942.

While herein the manufacture of a mandrel used as a pulling element or draw pin has been specifically set forth it none-the-less represents many different types of work pieces which may be produced by means of the apparatus embodying the present invention and the latter is thus suitable for use in a wide variety of applications. The invention is therefore not limited to the single practical application outlined above merely by way of an illustrative example out of many and hence said invention should be considered from a more broad standpoint as applicable to manufacture in general.

What is claimed is:

1. Apparatus for heading, upsetting or forming a work piece having a limited portion adapted to fit into a die, including a support, a hollow die rigid with said support capable of receiving the limited portion of said work piece while exposing another portion of the latter in a position to be worked upon, further die means, operating means causing said further die means and hollow die to cooperate for forming said work piece, an elongated ejector member having one end thereof directed toward the extremity of the limited portion of said workpiece in substantial alignment with said limited work piece portion in a position to directly abut the same through said hollow die and eject said limited portion from the latter upon longitudinal movement of the ejector member, return means for moving said ejector member upon completion of the work done upon the other or exposed portion of said work piece, and ejector support means proximately associated with said hollow die upon said ejector member capable of supporting the ejector member throughout its length and of reducing automatically in length when said ejector member is moved by said return means and caused to progressively enter said hollow die and eject said first mentioned limited portion of the work piece from said die.

2. Apparatus according to claim 1, in which the ejector support means includes two axially aligned hollow members adapted to surround the ejector member and to approach and recede from each other in axial direction, and in which one hollow member has at least one portion thereon directed toward the other hollow member and capable of interfitting with a portion upon the latter member to a variable extent.

3. Apparatus according to claim 1, in which the ejector support means includes two axially aligned hollow members adapted to surround and closely fit the ejector member and to approach and recede from each other in axial direction, and in which each hollow member has an integral projection thereon directed toward the other hollow member in substantial parallelism with the longitudinal axis of the ejector member and mutually interfitting to a variable extent with the corresponding projection on the other hollow member.

4. Apparatus according to claim 1, in which the ejector support means includes two axially aligned hollow members adapted to surround and closely fit the ejector member and to approach and recede from each other in axial direction, and in which each hollow member has a plurality of integral projections thereon directed toward the other hollow member in substantial parallelism with the longitudinal axis of the ejector member and mutually interfitting with the corresponding projections on the other hollow member.

5. Means for supporting the sizes of an elongated ejector rod for ejecting a portion of a work piece from a die in a cold heading machine or press and preventing failure of said rod when subjected to great end pressure, said means including a pair of tubular rod support members adapted to be mounted on said rod in mutual alignment and capable of approaching or receding from each other, an integral projection upon one end of one of said support members directed toward the other support member and capable of interfitting and cooperating to a variable extent with a portion upon the other support member, said projection and portion being substantially parallel with said ejector rod and in effective supporting contact with portions of the sides thereof along the length of the same.

6. Means for supporting the sides of an elongated ejector rod for ejecting a portion of a work piece from a die in a cold heading machine or press and preventing failure of said rod when subjected to great end pressure, said means including a pair of tubular rod support members adapted to be mounted on said rod in mutual alignment and capable of approaching or receding from each other, a plurality of integral projections upon one end of each of said support members mutually interfitting and cooperating to a variable extent with the projections on the other member in substantial parallelism with said ejector rod and in effective supporting contact with portions of the sides thereof along the length of the same.

7. Means for supporting an ejector rod against collapse or failure according to claim 5, having rigid means for exteriorly supporting one rod support member in fixed position and simultaneously supporting the other rod support member slidably in alignment therewith, and means for fixing said other or slidable rod support member on the ejector rod and causing said slidable rod support member to be slidable with said rod when the latter slides into or out of the fixed support member.

8. Means for supporting an ejector rod against collapse or failure according to claim 6, having rigid means for exteriorly supporting one rod support member with its associated integral projections in fixed position and simultaneously supporting the other rod support member with its associated integral projections slidably in alignment therewith, and means for fixing said other or slidable rod support member on the ejector rod and causing said slidable rod support member with its associated integral projections to be slidable with said rod when the latter slides into or out of the fixed support member.

9. Means for supporting an ejector rod against collapse or failure according to claim 6, in which the mutually interfitting projections upon the rod support members have the sides thereof cut or formed to fit slidably in mutual relation and to be effective to determine and maintain alignment of both rod support members in all nested or extended positions of the projections thereof.

10. Means for supporting an ejector rod against collapse or failure according to claim 6, in which the mutually interfitting projections constitute segments having the longitudinal facing sides thereof disposed radially with respect to the longitudinal axis of the ejector rod.

HOWARD R. FISCHER.

CERTIFICATE OF CORRECTION.

Patent No. 2,342,928.

February 29, 1944.

HOWARD R. FISCHER.

It is hereby certified that error appears in the printed specification of the above numbered patent requiring correction as follows: Page 1, first column, line 15, for "head" read --heading--; page 4, first column, line 7, claim 5, for "sizes" read --sides--; and that the said Letters Patent should be read with this correction therein that the same may conform to the record of the case in the Patent Office.

Signed and sealed this 16th day of May, A. D. 1944.

(Seal)

Leslie Frazer
Acting Commissioner of Patents.